United States Patent
Trionfetti

(10) Patent No.: US 10,260,594 B2
(45) Date of Patent: Apr. 16, 2019

(54) BALANCING DEVICE FOR ROTATING BODIES

(71) Applicant: BALANCE SYSTEMS S.r.L., Milan (IT)

(72) Inventor: Gianni Trionfetti, Agrate Brianza (IT)

(73) Assignee: BALANCE SYSTEMS S.r.L., Milan (IT)

( * ) Notice: Subject to any disclaimer, the term of this patent is extended or adjusted under 35 U.S.C. 154(b) by 450 days.

(21) Appl. No.: 14/258,657

(22) Filed: Apr. 22, 2014

(65) Prior Publication Data

US 2015/0300447 A1 Oct. 22, 2015

(51) Int. Cl.
*F16F 15/31* (2006.01)
*F16F 15/36* (2006.01)

(52) U.S. Cl.
CPC .............. *F16F 15/31* (2013.01); *F16F 15/36* (2013.01)

(58) Field of Classification Search
CPC ...... F16F 15/31; F16F 15/315; F16F 15/3153; F16F 15/3156; F16F 15/32; F16F 15/322; F16F 15/34; F16F 15/36; F16F 15/286; F16F 15/223; F16F 15/22; F16F 9/504; F16F 9/512; F16F 9/56; F16F 9/50; F16F 9/0245; H02K 7/04; D06F 37/245; B06B 1/164; B06B 1/162; B06B 1/161; B06B 1/166; G01M 1/36; G01M 1/32; B24B 41/042; B23Q 11/0035
See application file for complete search history.

(56) References Cited

U.S. PATENT DOCUMENTS

| | | | | |
|---|---|---|---|---|
| 3,178,878 A | * | 4/1965 | Brown | D07B 7/14 242/439.5 |
| 3,208,303 A | * | 9/1965 | Durouchoux | F16D 3/60 180/165 |
| 4,145,936 A | * | 3/1979 | Vincent | B64C 27/001 416/500 |
| 5,226,514 A | * | 7/1993 | Chimner | F16F 15/161 192/207 |

(Continued)

FOREIGN PATENT DOCUMENTS

| | | |
|---|---|---|
| DE | 10 2009 049 556 A1 | 4/2011 |
| DE | 102011102799 A1 * 12/2011 | ........... F16F 15/1464 |

(Continued)

OTHER PUBLICATIONS

EPO Translation of Description of DE 102011102799 A1, Kistler et al., Dec. 22, 2011.*

(Continued)

*Primary Examiner* — Daniel D Yabut
(74) *Attorney, Agent, or Firm* — Vorys, Sater, Seymour and Pease LLP

(57) ABSTRACT

Provided is a balancing device for positioning integrally to a rotating body configured to be placed in rotation around a rotation axis, including a plurality of storage means arranged in positions offset to the main rotation axis, at least one element suitable for winding wound in correspondence with a plurality of storage means, and transfer means configured to wind the elements configured for winding around storage means and to consequently vary the distribution of the mass of the elements suitable for winding over several storage means so as to balance the mass of said rotating body.

9 Claims, 2 Drawing Sheets

(56) References Cited

U.S. PATENT DOCUMENTS

| | | | |
|---|---|---|---|
| 5,354,186 A | 10/1994 | Murtuza et al. | |
| 6,915,720 B2 * | 7/2005 | Yamazaki | F16F 15/31 74/572.21 |
| 2009/0320640 A1 * | 12/2009 | Elliott | F16F 15/31 74/572.21 |

FOREIGN PATENT DOCUMENTS

| | | | | |
|---|---|---|---|---|
| EP | 0 124 306 A1 | 11/1984 | | |
| EP | 0 460 282 A1 | 12/1991 | | |
| EP | 1 645 362 A1 | 4/2006 | | |
| WO | WO 9517257 A1 * | 6/1995 | | B02C 19/16 |
| WO | WO 2011140016 A1 * | 11/2011 | | G01H 1/003 |

OTHER PUBLICATIONS

EPO Translation of Description of WO 9517257 A1, Vaillant, Jun. 29, 1995.*
European Search Report for European Application No. 13 15 6332, two pages, completed Jun. 19, 2013.

* cited by examiner

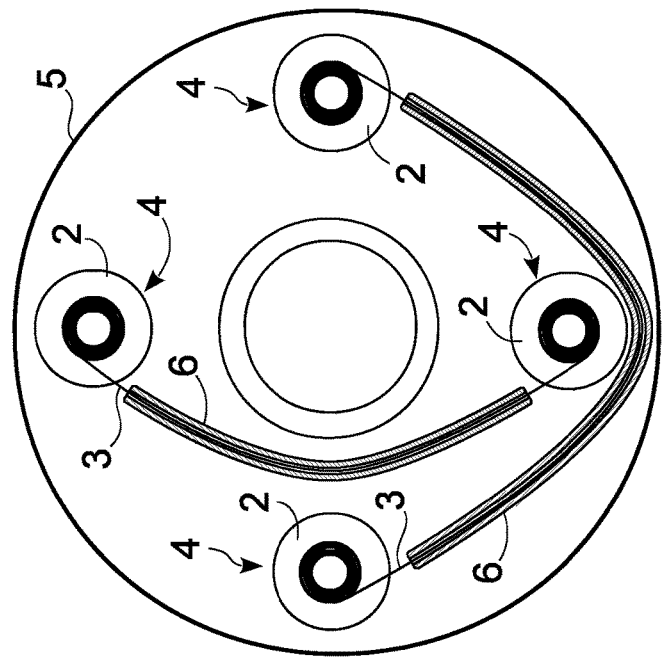
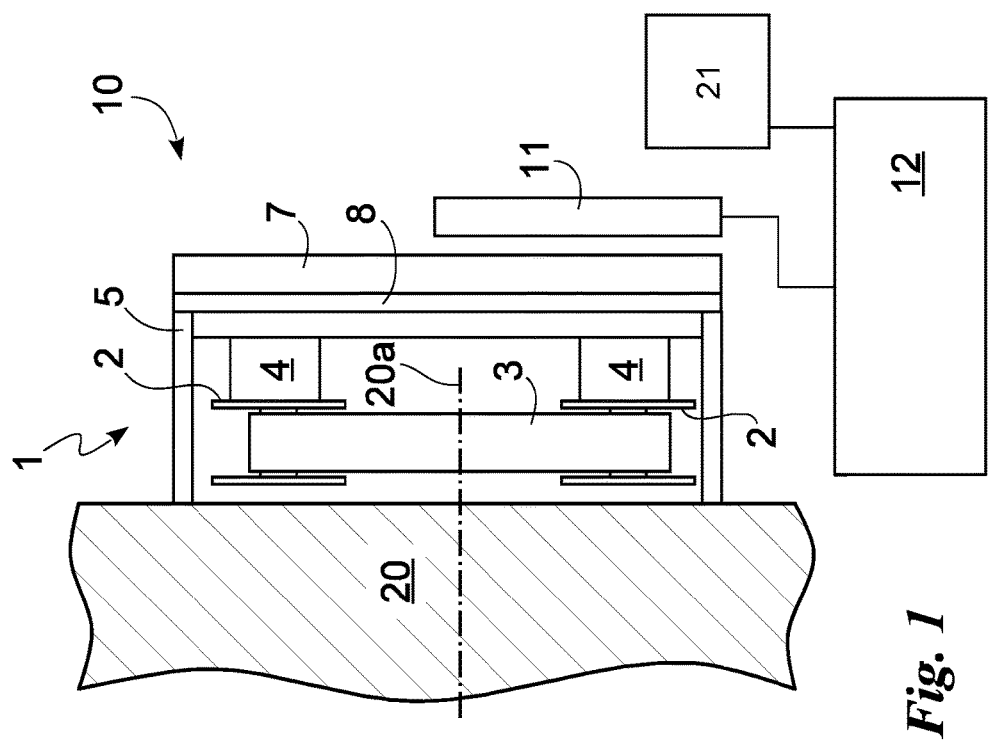

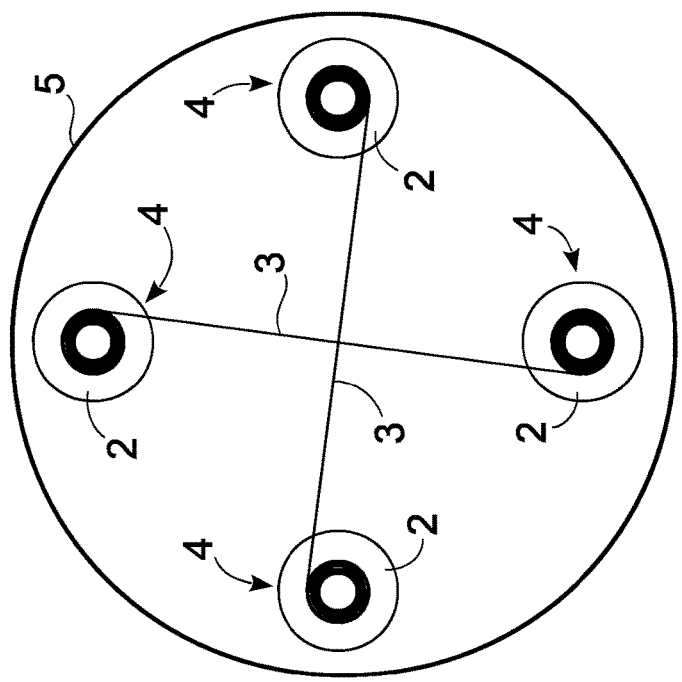
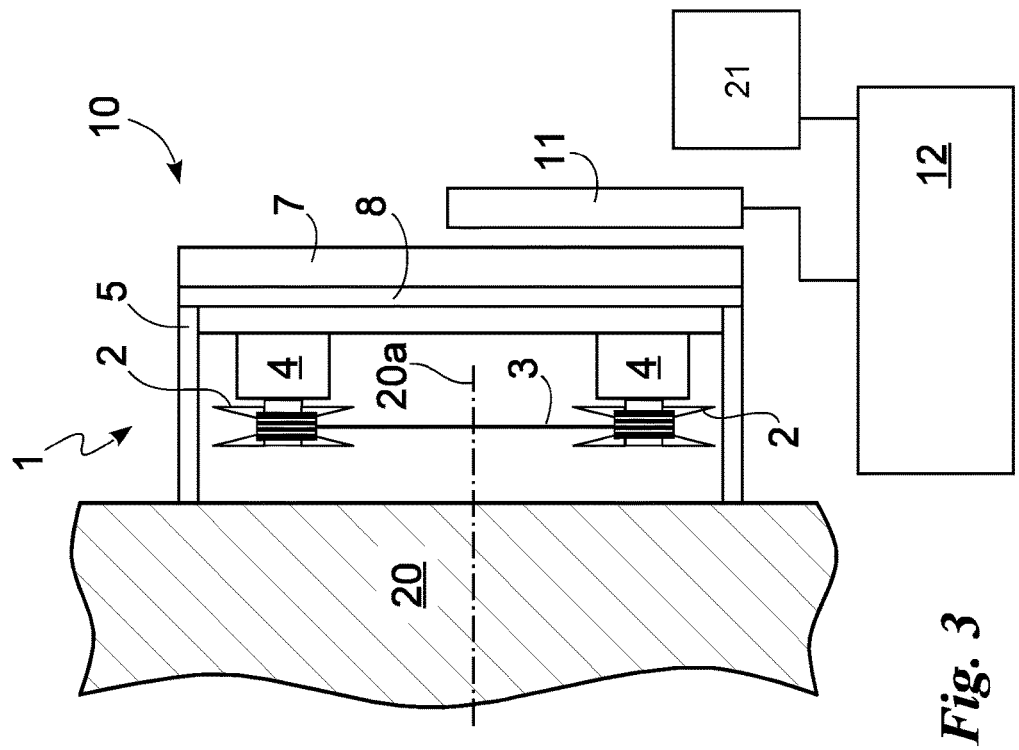

BALANCING DEVICE FOR ROTATING BODIES

FIELD OF THE INVENTION

The present invention relates to a balancing device for rotating bodies.

DESCRIPTION OF THE PRIOR ART

Balancing devices for rotating bodies and in particular for precision instruments, such as grinders and the like, which comprise a rotor portion which is placed in rotation, around an axis, at elevated angular speeds are currently known of.

The balancing devices are suitable for balancing said rotor portion, that is to shift the centre of mass of the latter positioning it substantially on the axis of rotation.

They are therefore needed to prevent the creation of vibrations generated by centrifugal forces in the presence of an imbalance of said rotor portion, which might lead to damage of the machine comprising said rotor portion, or to undesirable effects.

In particular, when the machine in question is a machine tool, undesirable vibrations may lead to an incorrect detection of any contact between the grinder or tool and the piece being machined, to machining inaccuracies and yet other drawbacks.

Said balancing devices are placed inside or integral with the rotor portion and comprise offset masses positionable, preferably by drive means such as electric motors, in positions such as to create a null imbalance or equal and opposite to the imbalance of the remaining part of the rotor portion, so as to balance the latter.

They are generally a substantially cylindrical shape and are positioned in such a way that the cylinder axis coincides with the rotation axis of the balancing device, so as to be able to present configurations with null imbalance if the rotor portion is already in itself balanced.

Said balancing devices known in the prior art have significant drawbacks.

They are in fact very complex and therefore expensive and subject to malfunction, in particular on account of the very great centrifugal forces which are created on the single elements.

A further drawback lies in the fact that the balancing devices are not always sufficiently accurate. For many applications, such as grinders, extreme accuracy is in fact required.

Moreover, when an acceptable level of accuracy is achieved this is to the detriment of the maximum balancing capacity.

Moreover, the functioning of the devices of the prior art is complex and takes a long time to activate.

In this situation the technical task of the present invention is to devise a balancing device for rotating bodies able to substantially overcome the drawbacks mentioned above.

Another important aim of the invention is to make a simple and robust balancing device.

A further purpose of the invention is to obtain a highly accurate balancing device without foregoing high balancing capacities.

SUMMARY OF THE INVENTION

The technical task and specified aims are resolved by a balancing device suitable for being positioned integrally to a rotating body suitable to be placed in rotation around a rotation axis, characterised in that it comprises: a plurality of storage means arranged in positions offset to the main rotation axis, at least one element suitable for winding wound in correspondence with a plurality of said storage means, transfer means suitable to wind said elements suitable for winding around the storage means and consequently to vary the distribution of the mass of the at least one element suitable for winding over several of said storage means so as to balance the mass of said rotating body.

Preferred and advantageous solutions are described in the other claims, in the specification and in the drawings.

BRIEF DESCRIPTION OF THE DRAWINGS

The characteristics and advantages of the invention are more clearly evident from the following detailed description of a preferred embodiment thereof, with reference to the accompanying drawings, in which:

FIG. 1 shows a schematic side view of a first example of balancing device according to the invention;

FIG. 2 shows a schematic front view of the first example of balancing device according to the invention;

FIG. 3 shows a schematic side view of a second example of balancing device according to the invention;

FIG. 4 shows a schematic front view of the second example of balancing device according to the invention.

DESCRIPTION OF THE PREFERRED EMBODIMENTS

With reference to said drawings, reference numeral 1 globally denotes the balancing device according to the invention.

It is suitable to be positioned integrally with a rotating body 20.

The rotating body 20 is preferably a tool, more preferably a grindstone, and even more preferably a grinder, or a numerical control milling cutter and the like. The rotating body 20 and the device 1 are thus part of the rotor of a machine, preferably of a machine tool, which is suitable to place the rotor in rotation around a main rotation axis 20a. The machine is further fitted with a stator, fixed in relation to the rotation of the rotor.

Said balancing device 1 is in addition suitable to form part of a balancing apparatus 10 controlled by said machine. In particular, the device 1 constitutes the rotor portion of the balancing apparatus 10.

The latter further suitably comprises a fixed portion 11, control means 12 of the balancing apparatus 10 and imbalance detection means 21.

More in detail the fixed portion 11 is suitable to transmit the signals and the power supply to the device 1, preferably by means of contact-free connections, such as inductive connections and the like. An example of such a wireless connection is described in the patent IT-A-M15090100 (see pg. 3 line 23 to pg. 8 line 10 and FIGS. 1, 3 and 4) issued to the same Applicant.

The control means 12 are instead appropriately connected via cable to the fixed portion 11, and permit the computerised control of the entire balancing apparatus 10 and control by the user. The latter are in themselves known.

The imbalance detection means 21 comprise piezoelectric sensors and similar devices suitable to detect any vibrations caused by imbalances in the rotor of the machine described. These are in functional connection with the control means 12 and, preferably, are of the type described in the patent EP-A-1645362 (paragraphs [0031]-[0082], FIG. 1 and FIGS. 5-10) issued to the same Applicant.

The balancing device 1 comprises a main axis, suitable to constitute the rotation axis of the device 1 and thus to coincide with the main rotation axis 20a of the rotating body 20.

The device 1 further comprises, in brief: a plurality of storage means 2 arranged in positions offset to the main rotation axis 20a, at least one element suitable for winding 3 wound in correspondence with several storage means 2, and transfer means 4 suitable for winding the elements suitable for winding 3 around the storage means 2.

Consequently the transfer means 4 are suitable to vary the distribution of the mass of the elements suitable for winding 3 over several storage means 2. By varying the distribution of the masses the centre of mass of the device 1 and of the connected rotating body 20 is varied. These are thus suitable to balance the rotating body 20.

More in detail the elements suitable for winding 3 are preferably composed of bands (FIG. 1 and FIG. 2) or, when of a greatly reduced width, of wires (FIG. 3 and FIG. 4). Said bands or wires are preferably made from metallic material and more preferably from steel, preferably harmonic or the like. In particular the bands preferably have a width of 0.5 cm to 2 cm and a thickness of 0.1 mm to 0.01 mm. The wires rather have a diameter to the order of magnitude of tenths of millimeters. In particular the mass per unit of length of a band is 1 g/m to 20 g/m, while in particular the mass per unit of length of a wire is 0.05 g/m to 1 g/m.

Alternatively the element suitable for winding 3 may comprise masses positioned at periodic distances and the like.

The elements suitable for winding 3 and the transfer means 4 are preferably paired, in particular each transfer means 4 is placed in correspondence with a storage means 2 and moreover, appropriately, each storage means 2 is placed in correspondence with a transfer means 4.

The transfer means 4 are preferably electric rotary motors inside the device 1 or, alternatively, sliding blocks or bearings which permit the winding of the elements 3 to be controlled from outside. These are suitable to wind the elements 3 in traction. In one alternative the transfer means 4 are suitable to unwind the elements 3 in compression, in particular if the elements 3 are not crushed if compressed as a result of comprising extremely accurate guides. In this latter case, a single transfer means 4 can be controlled by a pair of storage means 2.

The storage means 2 are substantially storage reels of the bands or wires or similar elements. They have an appropriate width of 0.5 cm to 3 cm and lateral flanges suitable to contain and channel the elements suitable for winding 3.

The storage means 2 are in offset positions, that is each one of them singly has a centre of mass not coinciding with the axis 20a, in such a way as to perform the balancing. They are preferably four in number and substantially arranged according to a rotational symmetry, in relation to the axis 20a and in the plane perpendicular to said axis 20a, of right angles. Thanks to such arrangement the storage means can balance any imbalance in the plane of the rotating body 20 and achieve a simple construction of the device 1

The storage means 2 present may even be six in number and preferably arranged according to a rotational symmetry, in relation to the axis 20a and in the plane perpendicular to said axis 20a, of angles of 60°. Thanks to such arrangement the storage means can balance any imbalance in the plane of the rotating body 20 and achieve a greater balancing mass, suitable to balance greater imbalances.

In correspondence with the storage means 2 sensors may be present suitable to measure the quantity of elements suitable for winding 3 wound or the proximity of the end of the element suitable for winding 3, appropriately by means of special markers inserted in said element suitable for winding 3 or the like.

The device 1 further comprises a containment body 5 suitable to contain the elements composing said device 1. The containment body 5 is, appropriately, a cylinder (FIG. 4) or ring (FIG. 2) shape, in this latter case it may be positioned astride the rotation shaft supporting the rotating body 20.

Inside the containment body 5 guides 6 are preferably also present for the elements suitable for winding 3. The guides 6 may be composed of hollow portions inside the containment body 5, or even of various guide elements such as rollers, columns or the like. They design trajectories permitting the elements suitable for winding 3 not to interfere with each other. In particular when the elements suitable for winding 3 are bands the guides 6 design trajectories which do not intersect in the plane perpendicular to the main axis 1a external to the storage means 2, as shown in FIG. 2.

On the contrary, elements suitable for winding 3 composed of wires, given their reduced thickness, can intersect in the plane perpendicular to the main axis 1a, as shown in FIG. 4. In the case in which the elements 3 are wires and the body 5 is without cavities for the shaft, the guides 6 may be absent (FIG. 4).

The device 1 further comprises reception means 7 suitable for being connected for the transfer of data and power with the fixed portion 11 described of the balancing apparatus 10. The reception means 7 thus preferably comprise contact-free induction connection means and the like.

The device 1 lastly comprises control means 8, on board the device 1, composed of electronics suitable to perform the control and command of said device 1.

The functioning of the balancing device 1 described above in a structural sense, is as follows.

When the machine is activated the rotor is placed in rotation and fitted with the balancing apparatus 10 comprising the balancing device 1 connected to the rotor.

The imbalance detection means 21 detect any imbalances and transmit the information to the control means 12, which transmit the information to the fixed portion 11 which without contact transmits it to the reception means 7 and from here to the control means 8 on board the device 1.

Such devices activate the rotation of the transfer means 4 which transport, by winding and unwinding, the elements suitable for winding between the various storage means 2, consequently distributing the masses so as to balance any imbalances.

The balancing device 1 according to the invention achieves some important advantages.

In fact, it is extremely accurate. In detail, given that the motors which constitute the transfer means 4 can be controlled by fractions of a revolution and given the dimensions described of the storage means 2 and the masses described per unit of length of the elements 3, it is possible to command variations of mass between the storage means 2 to the order of magnitude of hundredths of grams.

The device 1 further achieves an elevated maximum balancing capacity; it is thus suitable to balance imbalances of significant size.

The device 1 has, in addition, a very simple structure if compared to the known balancing devices. Said device is therefore economical and less subject to malfunctioning.

Modifications and variations may be made to the invention described herein without departing from the scope of the inventive concept. All details may be replaced with equivalent elements and the scope of the invention includes all other materials, shapes and dimensions.

The invention claimed is:

1. A balancing device suitable for varying a center of mass of a connected rotating body placed in rotation around a rotation axis, said balancing device comprising:
   a plurality of storage means arranged in positions offset to said main rotation axis;
   at least one element configured for winding in correspondence with said plurality of said storage means and comprising a distributed mass;
   a plurality of transfer means configured to wind said distributed mass of said elements configured for winding around said storage means in order to vary the mass of said storage means, and
   control means configured to command a variation of mass through said transfer means between said storage means so as to balance the mass of said rotating body,
   wherein said plurality of transfer means are rotary motors and wherein each one of said plurality of transfer means is placed in correspondence with one of said storage means.

2. The balancing device as claimed in claim 1, wherein each one of said storage means is placed in correspondence with one of said transfer means.

3. The balancing device as claimed in claim 1, wherein said elements configured for winding are wound in correspondence with two of said storage means.

4. The balancing device as claimed in claim 1, wherein said storage means are four in number and arranged according to a rotational symmetry, in relation to said axis and in a plane perpendicular to said axis, of right angles.

5. The balancing device as claimed in claim 1, wherein said storage means are six in number and arranged according to a rotational symmetry, in relation to said rotation axis and in a plane perpendicular to said rotation axis, of angles of 60°.

6. The balancing device as claimed in claim 1, wherein said elements configured for winding are metal bands.

7. The balancing device as claimed in claim 6, wherein said elements configured for winding are metal wires.

8. The balancing device as claimed in claim 1, further comprising a cylindrical containment body configured for constituting the outer casing of said balancing device.

9. The balancing device as claimed in claim 8, wherein said containment body is hollow.

* * * * *